(12) United States Patent
Lim et al.

(10) Patent No.: US 8,304,169 B2
(45) Date of Patent: Nov. 6, 2012

(54) ALKALI-DEVELOPABLE RESINS, METHOD FOR PREPARING THE SAME AND PHOTOSENSITIVE COMPOSITION COMPRISING THE ALKALI-DEVELOPABLE RESINS

(75) Inventors: Min-Young Lim, Sungnam-si (KR); Han-Soo Kim, Seoul (KR); Yoon-Hee Heo, Seoul (KR); Ji-Heum Yoo, Daejeon Metropolitan (KR); Sung-Hyun Kim, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 463 days.

(21) Appl. No.: 12/449,450

(22) PCT Filed: Feb. 11, 2008

(86) PCT No.: PCT/KR2008/000790
§ 371 (c)(1),
(2), (4) Date: Aug. 7, 2009

(87) PCT Pub. No.: WO2008/097065
PCT Pub. Date: Aug. 14, 2008

(65) Prior Publication Data
US 2010/0323295 A1    Dec. 23, 2010

(30) Foreign Application Priority Data
Feb. 8, 2007  (KR) .................. 10-2007-0013145

(51) Int. Cl.
G03F 7/032  (2006.01)
G03F 7/028  (2006.01)
G03F 7/027  (2006.01)

(52) U.S. Cl. ................. 430/287.1; 430/285.1; 430/908; 430/910; 430/916; 525/326.7; 525/327.3; 525/327.7; 525/330.3; 525/385; 525/386

(58) Field of Classification Search .................. None
See application file for complete search history.

(56) References Cited

U.S. PATENT DOCUMENTS

| 6,180,323 | B1 | 1/2001 | McKeever | |
|---|---|---|---|---|
| 6,410,206 | B1 | 6/2002 | Ueda et al. | |
| 2001/0030703 | A1* | 10/2001 | Inoue | 348/308 |
| 2002/0117080 | A1* | 8/2002 | Okutsu et al. | 106/31.78 |
| 2005/0185129 | A1* | 8/2005 | Kim et al. | 349/156 |

FOREIGN PATENT DOCUMENTS
KR    10-2005-0094163    *  9/2005
WO    WO 01/13175 A2     2/2005

OTHER PUBLICATIONS

English translation of KR 10-2005-0094163, provided by KIPO (2005).*

* cited by examiner

*Primary Examiner* — Sin J. Lee
(74) *Attorney, Agent, or Firm* — McKenna Long & Aldridge LLP

(57) ABSTRACT

The present invention relates to a novel alkali-developable resin, a method of producing the alkali-developable resin, a photosensitive resin composition including the alkali-developable resin, and a device that is manufactured by using the photosensitive composition. In the case of when the alkali-developable resin is used as a component of the photosensitive composition, the photosensitivity, the developability and the film remaining rate of the pattern are improved.

20 Claims, 1 Drawing Sheet

ALKALI-DEVELOPABLE RESINS, METHOD FOR PREPARING THE SAME AND PHOTOSENSITIVE COMPOSITION COMPRISING THE ALKALI-DEVELOPABLE RESINS

This application claims the benefit of PCT/KR2008/000790 filed on Feb. 11, 2008 and Korean Patent Application No. 10-2007-0013145 filed on Feb. 8, 2007, both of which are hereby incorporated herein by reference for all purposes in their entirety.

1. Technical Field

The present invention relates to a novel alkali-developable resin, a method of producing the alkali-developable resin, a photosensitive composition including the alkali-developable resin, and a device using the photosensitive composition. More particularly, the present invention relates to a novel alkali-developable resin that is capable of improving the photosensitivity, the developability, and the film remaining rate, and a photosensitive composition including the same.

This application claims priority from Korean Patent Application No. 10-2007-0013145 filed on Feb. 8, 2007 in the KIPO, the disclosure of which is incorporated herein by reference in its entirety.

2. Background Art

A photosensitive composition has been used for various purposes such as a sensitizer for manufacturing a color filter, an overcoat sensitizer, and a column spacer or the like. In general, the photosensitive composition includes an alkali-developable resin, a polymerizable compound having an ethylenically unsaturated bond, a photopolymerization initiator, a solvent or the like. The photosensitive composition is applied on a substrate to form a film, a predetermined portion of the film is exposed by using radiation of radioactive rays by means of a photomask and the like, and a non-exposed portion is subjected to development treatment to be removed, thus forming a pattern.

However, when the photosensitive composition is used, in order to improve the yield per unit time of the process, an exposure time and a development time are reduced. Therefore, it is required to improve the photosensitivity and the developability of the photosensitive composition.

Representative methods of improving the photosensitivity of the photosensitive composition include the use of the photoinitiator having the high photosensitivity or an increase in amount of the used photoinitiator. However, there is a problem in that the photoinitiator having the high photosensitivity is relatively costly. In addition, in the case of when the amount of the used photoinitiator is increased, since a great amount of sublimable foreign materials are generated during a post baking process, an oven may be contaminated or parts such as liquid crystals in the LCD panel may be contaminated.

Recently, in order to add a photopolymerizable functional group to a side chain of an alkali-developable resin that is used in a photosensitive composition, a method of photo-crosslinking the alkali-developable resin and an ethylenically unsaturated compound has been made.

For example, Korean Patent Application Publication No. 2000-0012118 discloses a method of performing a condensation reaction of a carboxy group or an alcohol group in the chain of the alkali-developable resin and (meth)acryloyloxy alkyl isocyanate to introduce the (meth)acryloyl group in the chain of the alkali-developable resin. Furthermore, Korean Patent Application Publication No. 2001-0018075 discloses a method of performing a condensation reaction of the carboxy group in the chain of the alkali-developable resin and glycidyl (meth)acrylate to introduce the (meth)acryloyl group in the chain of the alkali-developable resin. With respect to this, the photosensitivity is in direct proportion to the ratio of the photopolymerizable reactive group that is introduced in the alkali-developable resin. However, since the above photopolymerizable reactive group is introduced into the acidic group of the alkali-developable resin, if the ratio of the photopolymerizable reactive group of the alkali-developable resin is increased, the ratio of the remaining acidic group is relatively reduced, thus reducing the developability.

Accordingly, in order to satisfy both the photosensitivity and the developability, while the alkali-developable resin is produced before the photopolymerizable functional group is introduced, it is required that an excessive amount of acidic group unit is added to increase the ratio of the acidic group unit of the alkali-developable resin so that a desirable acid value is maintained after a large amount of photopolymerizable functional group is introduced.

However, since the alkali-developable resin that has the high acid value has the low solubility in respects to the solvent that is used to introduce the photopolymerizable functional group, there is a problem in that the precipitation occurs during the polymerization, thus obstructing ensuring of the desired molecular weight. In order to increase the solubility in respects to the solvent of the alkali-developable resin having the high acid value, a solvent having a high polarity may be used during the polymerization. However, the solvent having the high polarity is apt to obstruct the dispersion stability of the pigment of the color filter. In addition, while the alkali-developable resin is produced, if the ratio of the acidic group unit is increased, the ratio of the unit that provides the other film properties to the film is relatively reduced. Thus, it is impossible to obtain the desirable other film properties.

Korean Patent Application Publication No. 2005-0094163 discloses a method of introducing additional acidic group after a photopolymerizable reactive group is introduced to a polymer including an acidic group to produce an alkali-developable resin. In the polymerization method, when the photopolymerizable reactive group is introduced, since a relative small amount of acidic group is included in the photopolymerizable reactive group, the polymer has the excellent solubility in the solvent having the low polarity. However, the alkali-developable resin is disadvantageous in that the alkali-developable resin can sufficiently provide the reactive group and the acidic group, but the film remaining rate of the pattern is reduced during the post baking treatment process.

DISCLOSURE OF INVENTION

Technical Problem

It is an object of the present invention to provide an alkali-developable resin that is capable of improving the photosensitivity, the developability, and the film remaining rate, a method of producing the alkali-developable resin, a photosensitive composition including the alkali-developable resin, and a device using the photosensitive composition.

Technical Solution

The present invention provides an alkali-developable resin including a unit that is represented by the following Formula 1, a unit that is represented by Formula 2, a unit that is represented by Formula 3, a unit that is represented by Formula 4, and a unit that is represented by Formula 5. Preferably, the present invention provides an alkali-developable resin that is represented by the following Formula 6

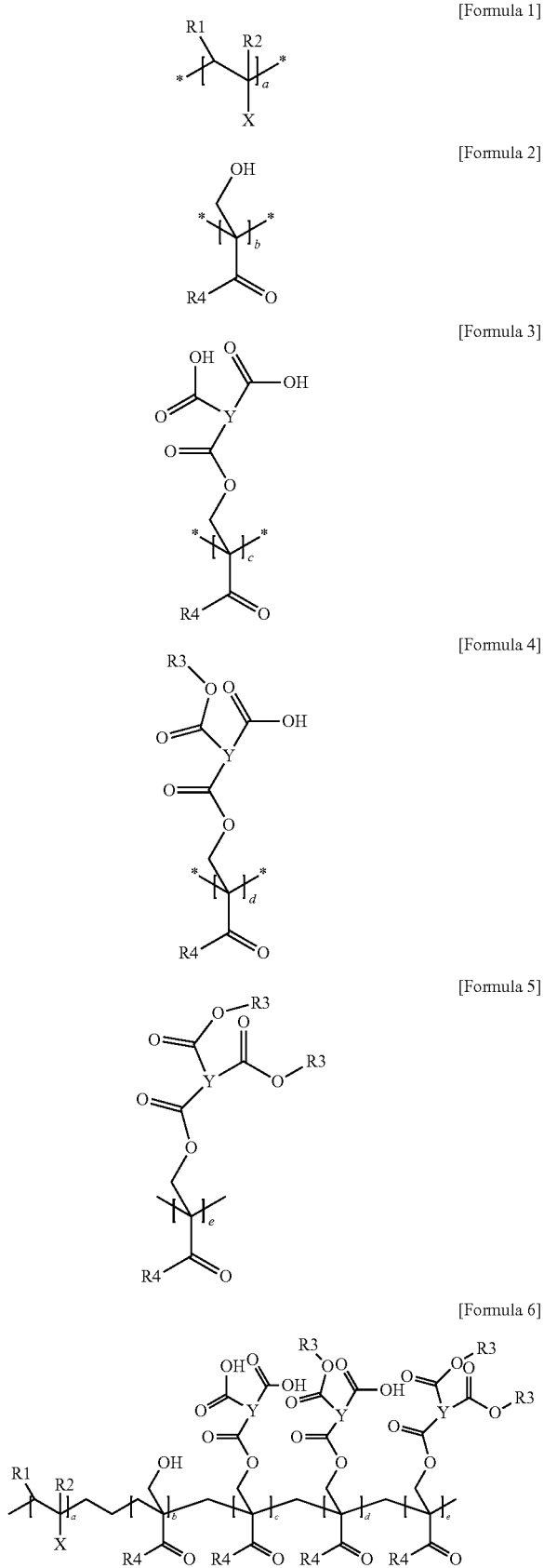

[Formula 1]

[Formula 2]

[Formula 3]

[Formula 4]

[Formula 5]

[Formula 6]

wherein R1 is hydrogen or a group that forms a 5-membered cyclic carboxylic anhydride or imide structure, for example, succinimide or succinic anhydride, in conjunction with X, R2s are each independently hydrogen or methyl, R3 is a group that is derived from a compound selected from the group consisting of glycidyl(meth)acrylate, allyl glycidyl ether, 3,4-epoxycyclohexylmethyl (meth)acrylate, glycidyl 5-norbornene-2-methyl-2-carboxylate (endo and exo mixtures), 1,2-epoxy-5-hexene, and 1,2-epoxy-9-decene, R4s are each independently a $C_1$ to $C_4$ alkoxy group, X is any one selected from the group consisting of $C_1$ to $C_{12}$ alkyl ester, $C_2$ to $C_6$ alkyl ester that is substituted with 1 to 2 hydroxyl groups, $C_2$ to $C_6$ alkyl ester that is substituted with a $C_1$ to $C_3$ alkoxy group, $C_1$ to $C_3$ alkyl ester that is substituted with a halogen group, $C_1$ to $C_3$ alkoxy poly(n=2 to 30) alkylene ($C_2$ to $C_3$) glycol ester, $C_1$ to $C_6$ alkyl ester that is substituted with a phenyl group, phenyl that is substituted with a $C_1$ to $C_6$ alkyl group, phenyl that is substituted with $C_1$ to $C_6$ alkoxy, phenyl that is substituted with a halogen group, $C_1$ to $C_6$ alkoxy methyl, glycidoxy methyl, and a group that forms a 5-membered cyclic carboxylic anhydride or imide structure, for example, maleimide or maleic anhydride, in conjunction with R1, a, b, c, d, and e are each a molar ratio, a is in the range of 10 to 90, b is in the range of 5 to 30, c is in the range of 1 to 40, and d and e are each independently in the range of 1 to 40, Y is a group that is generated by using a ring opening polymerization reaction of a compound that is represented by the following Formula 7 and an alcohol group of the unit that is represented by the above Formula 2,

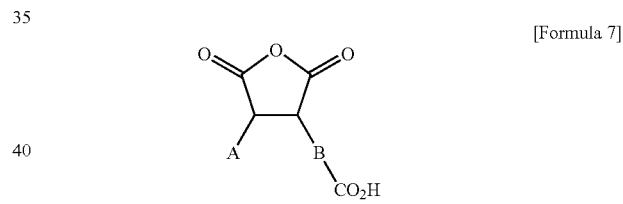

[Formula 7]

wherein A is any one selected from the group consisting of hydrogen, $C_1$ to $C_6$ alkoxy, phenoxy, $C_1$ to $C_{10}$ alkyl that is unsubstituted or substituted with halogen, $C_2$ to $C_{10}$ alkenyl that includes 1 to 3 unsaturated groups, and phenyl, and B is any one selected from the group consisting of $C_1$ to $C_6$ alkoxy, phenoxy, $C_1$ to $C_{10}$ alkylene that is unsubstituted or substituted with halogen, $C_2$ to $C_{10}$ alkenylene that includes 1 to 3 unsaturated groups, and phenylene, and A and B may be connected to each other to form a pentagonal or hexagonal cycle.

In addition, the present, invention provides a method of producing an alkali-developable resin, which includes a) polymerizing a monomer used to form a unit that is represented by the following Formula 1 and a monomer used to form a unit that is represented by the following Formula 2 to prepare a polymer; b) adding a compound that is represented by the following Formula 7 to the polymer of the above step a) and performing polymerization to prepare a polymer; and c) adding a compound containing an epoxy group to the polymer of the above step b) to perform polymerization.

Additionally, the present invention provides a photosensitive composition that includes the alkali-developable resin, and a color filter, an overcoat, and a column spacer that are produced by using the same.

Advantageous Effects

Since an alkali-developable resin according to the present invention sufficiently includes a photopolymerizable reactive group that is capable of participating in photopolymerization, the alkali-developable resin has the excellent photosensitivity, and since the alkali-developable resin sufficiently includes an acidic group, the alkali-developable resin has the excellent developability. In addition, since after the acidic group is provided to a polymer containing an alcoholic group, the photopolymerizable reactive group is added thereto to produce the alkali-developable resin, the acidic group is not included during the polymerization. Thus, since a polymer having the excellent solubility can be used in a solvent having the low polarity, problems regarding the precipitation can be minimized during the polymerization. Accordingly, in the case of when the above-mentioned alkali-developable resin is used in the photosensitive composition, it is possible to significantly improve the photosensitivity, the developability, and the film remaining rate of the pattern without the problems of the above-mentioned related arts.

BEST MODE FOR CARRYING OUT THE INVENTION

Figure 1:
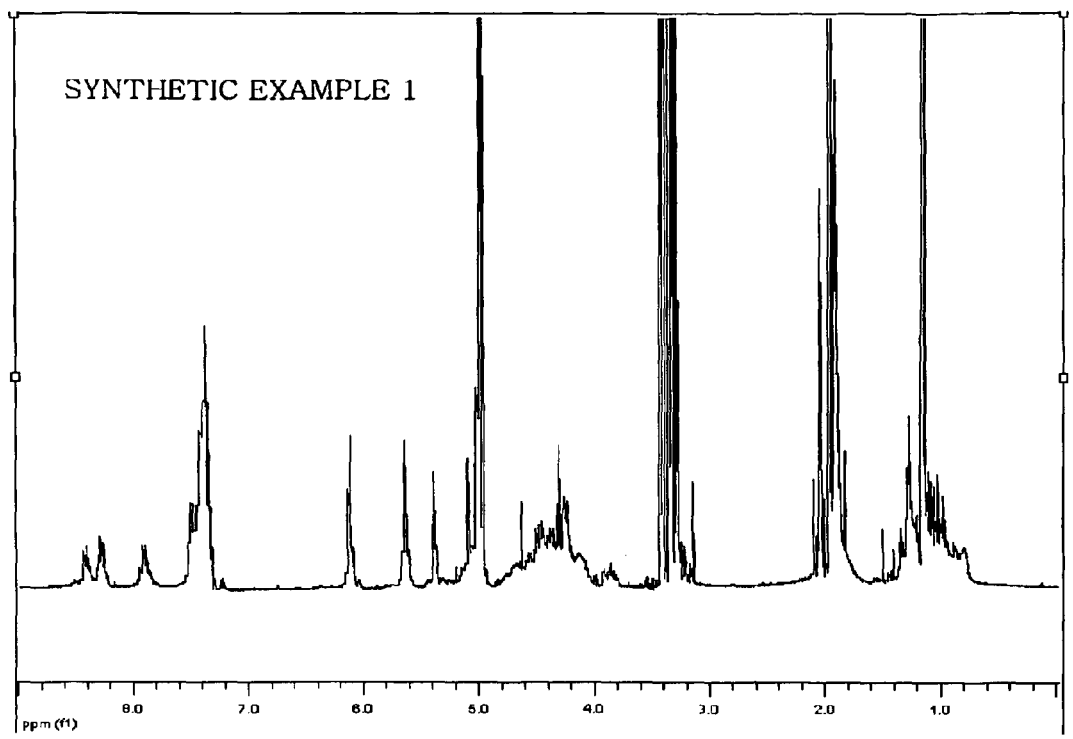
FIG. 1 is an NMR graph of an alkali-developable resin that is produced in Synthetic Example 1 of the present invention.

Hereinafter, the present invention will be described in detail.

An alkali-developable resin according to the present invention includes a unit that is represented by Formula 1, a unit that is represented by Formula 2, a unit that is represented by Formula 3, a unit that is represented by Formula 4, and a unit that is represented by Formula 5.

In the above Formulae 4 to 6, R3 is preferably —CH$_2$—C(OH)H—CH$_2$—O—C(O)—C(CH)H or —CH$_2$—C(OH)H—CH$_2$—O—C(O)—C(CH$_2$)—CH$_3$, but is not limited thereto.

In the above Formulae 3 to 6, Y may be represented by the following Structural Formula, but is not limited thereto.

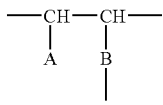

In the above Structural Formula, A and B are as defined in the above Formula 7.

The alkali-developable resin that contains the unit that is represented by the above Formula 1, the unit that is represented by Formula 2, the unit that is represented by Formula 3, the unit that is represented by Formula 4, and the unit that is represented by Formula 5 will be described in detail.

The unit that is represented by the above Formula 1 may provide a film property to a film that is formed by applying a photosensitive composition containing the alkali-developable resin according to the present invention and may control developability resistance or chemical resistance according to the type of R1, R2, and X that are substituent groups.

In addition, the unit that is represented by the above Formula 1 is contained in a typical alkali-developable resin that is used in a known photosensitive composition, and it is well known that the film properties of the film are changed according to the configuration of the unit. For example, in the case of when X of the unit that is represented by the above Formula 1 is alkyl ester having a long chain, for example, ethylhexyl ester, a glass transition temperature of a polymer is low and the formed film is relatively soft as compared to the case of alkyl ester having a short chain, for example, methyl ester. Thus, the developability or the coating property is improved. Furthermore, in the case of when X has a structure that inactively moves, for example, in the case of when X is phenyl, a glass transition temperature of a polymer is high and the formed film has relatively high hardness as compared to the case of compounds other than phenyl. Thus, chemical resistance is improved. However, in respects to the properties of the polymer according to the glass transition temperature, since advantages are frequently overlapped, the type of unit and the mixing ratio of the units may depend on the purpose of the photosensitive composition.

An alcohol group of the unit that is represented by the above Formula 2 functions to improve adhesion strength in respects to a glass substrate, and a portion of the unit that is represented by the above Formula 2 provides an alcohol group to form the unit that is represented by the above Formula 3.

The unit that is represented by the above Formula 3 is derived from the unit that is represented by the above Formula 2, that is, the unit that is represented by the above Formula 3 has a structure in which a carboxylic acid group is introduced to the alcohol group of the unit that is represented by the above Formula 2. The carboxylic acid group may be generated by using a ring opening condensation reaction of the alcohol group of the unit that is represented by the above Formula 2 and a compound that is to be added and is represented by Formula 7. The above carboxylic acid group may provide the acidic group to farm the unit that is represented by Formula 4 or 5 and improve the developability.

Specific examples of the compounds that are represented by the above Formula 7 may include compounds that are represented by the following Formulae 8 to 15. Among them, the compound that is represented by the above Formula 9 is most preferable, but is not limited thereto.

[Formula 8]

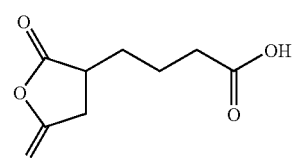

[Formula 9]

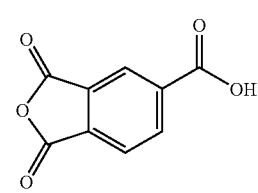

-continued

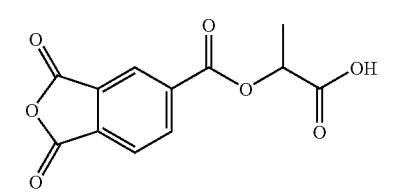
[Formula 10]

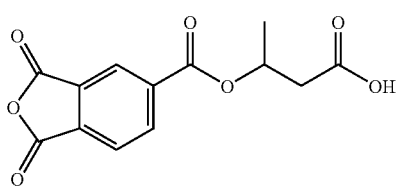
[Formula 11]

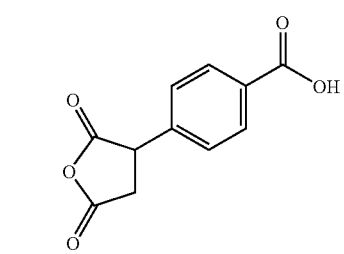
[Formula 12]

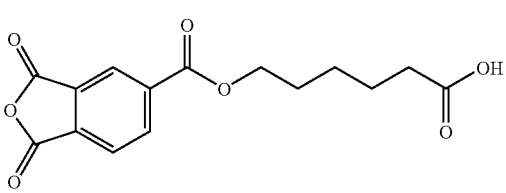
[Formula 13]

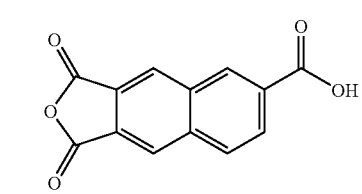
[Formula 14]

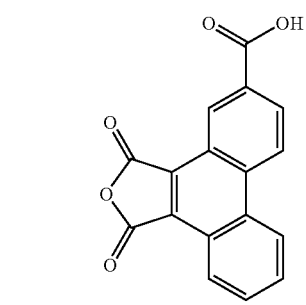
[Formula 15]

The unit that is represented by the above Formula 4 and the unit that is represented by Formula 5 are derived from the unit that is represented by the above Formula 3, that is, the unit that is represented by the above Formula 4 and the unit that is represented by Formula 5 have a structure in which a (meth) acryloyloxy group that is a photopolymerizable reactive group is additionally introduced to the carboxylic acid group of the unit that is represented by the above Formula 3. The (meth)acryloyloxy group may be generated by using a ring opening condensation reaction of the carboxylic group of the unit that is represented by the above Formula 3 and a compound such as glycidyl (meth)acrylate that has an epoxy group and is to be added. An ethylene unsaturated group of the above (meth)acryloyloxy group is polymerized in conjunction with an ethylenically unsaturated compound of the photosensitive composition during the exposure, which contributes to an increase in photopolymerization density of the film. In addition, the unit that is represented by the above Formula 4 and the unit that is represented by Formula 5 include all the (meth)acryloyloxy group and the carboxylic acid group, which contributes to the improvement in the photosensitivity and the developability. Additionally, in the case of when the unit that is represented by Formula 4 and the unit that is represented by Formula 5, which are the photopolymerizable reactive group, are introduced, since the (meth)acryloyloxy group can be introduced in a larger amount as compared to the case of a known alkali-developable reactive resin, the photosensitivity may be significantly improved.

It is preferable that the alkali-developable resin according to the present invention have the acid value in the range of 30 to 300 KOH mg/g and the weight average molecular weight in the range of 1,000 to 200,000.

A method of producing the alkali-developable resin that includes the unit that is represented by the above Formula 1, the unit that is represented by Formula 2, the unit that is represented by Formula 3, the unit that is represented by Formula 4, and the unit that is represented by Formula 5 will be described in detail.

First, the polymer including the unit that is represented by the above Formula 1 and the unit that is represented by the above Formula 2 may be produced by using any one of various polymerization methods that are known in the art and include radical polymerization, cation polymerization, anion polymerization, condensation polymerization or the like. In views of easiness of production or economic efficiency, it is most preferable to use the radical polymerization.

For example, the polymer including the unit that is represented by the above Formula 1 and the unit that is represented by the above Formula 2 may be produced by mixing a monomer used to form the unit that is represented by Formula 1 and a monomer used to form the unit that is represented by the above Formula 2 in conjunction with a polymerization solvent, heating the mixture at a predetermined temperature, and purging nitrogen to remove oxygen. In addition, preferably, a radical polymerization initiator and a chain transfer agent may be added and the polymerization temperature may be maintained to produce the polymer if necessary. In the above method, the polymerization temperature and the polymerization time may be determined in consideration of a half-life according to the temperature of the used polymerization initiator. For example, since 2,2'-azobis isobutyronitrile (AIBN) has the half-life of 4.8 hour at 70° C., it is preferable that the polymerization time be 6 hours or more when 2,2'-azobis isobutyronitrile be used. In general, it is preferable that the polymerization temperature be in the range of 50 to 150° C. and the polymerization time be in the range of 30 min to 48 hours.

Examples of the monomer used to form the unit that is represented by the above Formula 1 may include, but are not limited to one or more compounds that are selected from the group consisting of unsaturated carboxylic acid esters, such as benzyl (meth)acrylate, methyl(meth)acrylate, ethyl(meth) acrylate, butyl(meth)acrylate, dimethylaminoethyl(meth) acrylate, isobutyl(meth)acrylate, t-butyl(meth)acrylate, cyclohexyl(meth)acrylate, isobornyl(meth)acrylate, ethylhexyl(meth)acrylate, 2-phenoxyethyl(meth)acrylate, tetrahydrofurfuryl(meth)acrylate, hydroxyethyl(meth)acrylate, 2-hydroxypropyl(meth)acrylate, 2-hydroxy-3-chloropropyl (meth)acrylate, 4-hydroxybutyl(meth)acrylate, acyloctyloxy-2-hydroxypropyl(meth)acrylate, glycerol(meth)acrylate, 2-methoxyethyl(meth)acrylate, 3-methoxybutyl(meth)acrylate, ethoxydiethylene glycol(meth)acrylate, methoxytriethyleneglycol(meth)acrylate, methoxytripropyleneglycol(meth)acrylate, poly(ethyleneglycol)methylether (meth)acrylate, phenoxydiethyleneglycol(meth)acrylate, p-nonylphenoxypolyethyleneglycol(meth)acrylate, p-nonylphenoxypolypropylene glycol(meth)acrylate, glycidyl (meth)acrylate, tetrafluoropropyl (meth)acrylate, 1,1,1,3,3,3-hexafluoroisopropyl(meth)acrylate, octafluoropentyl(meth)acrylate, heptadecafluorodecyl(meth)acrylate, and tribromophenyl(meth)acrylate; aromatic vinyls, such as styrene, α-methylstyrene, (o,m,p)-vinyltoluene, (o,m,p)-methoxystyrene, and (o,m,p)-chlorostyrene; unsaturated ethers, such as vinyl methyl ether, vinyl ethyl ether, and allyl glycidyl ether; N-vinyl tertiary amines, such as N-vinyl pyrrolidone, N-vinyl carbazole, and N-vinyl morpholine; unsaturated imides, such as N-phenylmaleimide, N-(4-chlorophenyl)maleimide, N-(4-hydroxyphenyl)maleimide, and N-cyclohexylmaleimide; and maleic anhydrides, such as maleic anhydride and methyl maleic anhydride.

The monomer used to form the unit that is represented by the above Formula 2 may be a compound including an alcohol group and an ethylenically unsaturated group. More specific examples of the monomer include, but are not limited to one or more compounds selected from the group consisting of methyl α-hydroxymethyl acrylate, ethyl α-hydroxymethyl acrylate, propyl α-hydroxymethyl acrylate, butyl α-hydroxymethyl acrylate and the like.

The above radical polymerization initiator may be an initiator that is known in the art, and specific examples of the radical polymerization initiator include 2,2'-azobisisobutyronitrile (AIBN), 2,2'-azobis-(2,4-dimethyl valeronitrile), 2,2'-azobis-(4-methoxy-2,4-dimethylvaleronitrile), benzoylperoxide, lauroyl peroxide, t-butyl peroxypivalate, 1,1'-bis-(bis-t-butylperoxy)cyclohexane and the like.

The above chain transfer agent is used to control the weight average molecular weight, and specific examples of the chain transfer agent may include, but are not limited to n-hexylmercaptan, n-octyl mercaptan, n-dodecyl mercaptan, t-dodecyl mercaptan, thioglycolic acid, 3-mercaptopropionic acid, α-methylstyrene dimer and the like.

The compound that is represented by the above Formula 7 may be added to the polymer produced as described above including the unit that is represented by the above Formula 1 and the unit that is represented by Formula 2 to form the unit that is represented by the above Formula 3. This may be formed by using a ring opening condensation reaction of a hydroxyl group of the unit that is represented by Formula 2 and an anhydrous dicarboxylic acid of a compound that is represented by Formula 7. In addition, the above condensation reaction may occur more easily in the case of when a small amount of catalyst is added. The catalyst that is capable of being used in the present invention may be a typical catalyst that is known as a catalyst of a condensation reaction in the art. Examples of the catalyst may include alkyl ammonium salts, triphenylphosphine, triphenylantimon, dimethylaminopyridine which are a basic catalyst. It is preferable that the reaction temperature of the above condensation reaction be in the range of 90 to 120° C. and the reaction time be in the range of 1 to 24 hours.

A compound containing an epoxy group may be introduced to the polymer including the produced units that are represented by Formulae 1, 2, and 3 to form the unit that is represented by the above Formula 4 and the unit that is represented by Formula 5. Examples of the compound containing the epoxy group may include glycidyl (meth)acrylate, allyl glycidyl ether, glycidyl(meth)acrylate, 3,4-epoxycyclohexylmethyl(meth)acrylate, glycidyl 5-norbornene-2-methyl-2-carboxylate (endo and exo mixtures), 1,2-epoxy-5-hexene, 1,2-epoxy-9-decene and the like. It is more preferable to use glycidyl(meth)acrylate. However, the compound containing the epoxy group is not limited thereto.

The unit that is represented by the above Formula 4 and the unit that is represented by Formula 5 may be formed by using a ring opening condensation reaction of the acidic group of the unit that is represented by Formula 3 and the epoxy group of the compound containing the epoxy group such as glycidyl (meth)acrylate. The above-mentioned condensation reaction may be performed by using a method that is known in the art. In the above-mentioned reaction, the above-mentioned catalyst used when the unit that is represented by the above Formula 3 is introduced may be continuously used as a catalyst. Accordingly, after the reaction in which the unit that is represented by the above Formula 3 is introduced, the compound containing the epoxy group such as glycidyl(meth) acrylate may be added to form the unit that is represented by Formula 4 and the unit that is represented by Formula 5. With respect to this, the carboxylic acid that is contained in the unit that is represented by the above Formula 3 acts as a nucleophilic agent to remove a hydrogen ion by using the above catalyst and to be present in an anion form, which attacks epoxy of the compound containing the epoxy group such as glycidyl(meth)acrylate, thus performing the reaction.

It is preferable that the reaction temperature of the above condensation reaction be in the range of 100 to 150° C. and the reaction time be in the range of 1 to 24 hours. In the above-mentioned temperature range, since the ethylene group of the compound containing the epoxy group such as glycidyl(meth)acrylate may be subjected to gelation through the thermal polymerization, a thermal polymerization inhibitor that is useful to the above-mentioned polymerization reaction may be used. A representative example of the thermal polymerization inhibitor include 4-methoxy phenol (MEHQ).

Furthermore, the present invention provides a photosensitive composition including A) an alkali-developable resin; B) a polymerizable compound having an ethylenically unsaturated bond; C) a photopolymerization initiator; and D) a solvent.

The photosensitive composition according to the present invention may include one or more selected from the alkali-developable resins including the unit that is represented by the above Formula 1, the unit that is represented by Formula 2, the unit that is represented by Formula 3, the unit that is represented by Formula 4, and the unit that is represented by Formula 5 as the above A) alkali-developable resin.

It is preferable that the above photosensitive composition include A) 1 to 30 parts by weight of the alkali-developable resin, B) 0.5 to 20 parts by weight of the polymerizable compound having the ethylenically unsaturated bond, C) 0.1 to 15 parts by weight of the photopolymerization initiator, and D) 35 to 95 parts by weight of the solvent based on 100 parts by weight of the photosensitive composition. In addition, in the case of when an additive is added, it is preferable that the additive include 0.5 to 20 parts by weight of the coloring agent and 0.01 to 20 parts by weight of the residual additives based on 100 parts by weight of the photosensitive composition.

Examples of the B) polymerizable compound having the ethylenically unsaturated bond may include one or more selected from the group consisting of compounds obtained by esterifying polyhydric alcohols, such as ethylene glycol di(meth)acrylate, polyethylene glycol di(meth)acrylate including 2 to 14 ethylene groups, trimethyllolpropane di(meth)acrylate, trimethylolpropane tri(meth)acrylate, pentaerythritol tri(meth)acrylate, pentaerythritol tetra(meth)acrylate, propylene glycol di(meth)acrylate including 2 to 14 propylene groups, dipentaerythritol penta(meth)acrylate, and dipentaerythritol hexa(meth)acrylate, with α,β-unsaturated carboxylic acids; compounds obtained by adding a (meth) acrylic acid to a compound containing glycidyl group, such as a trimethylolpropane triglycidyletheracrylic acid adduct and a bisphenol A diglycidyletheracrylic acid adduct; ester compounds obtained from a compound having a hydroxyl group or an ethylenically unsaturated bond and a polyhydriccarboxylic acid, and adducts a compound having a hydroxyl group or an ethylenically unsaturated bond with polyisocyanate, such as phthalic acid, diester of β-hydroxyethyl(meth) acrylate and adduct of β-hydroxyethyl(meth)acrylate with toluene diisocyanate; and (meth)acrylic acid alkyl esters, such as methyl(meth)acrylate, ethyl(meth)acrylate, butyl (meth)acrylate, and 2-ethylhexyl(meth)acrylate. However, the polymerizable compound is not limited thereto, and materials that are known in the art may be used as the polymerizable compound.

Examples of the C) photopolymerization initiator may include one or more compounds selected from the group consisting of triazine-based compounds, such as 2,4-trichloromethyl-(4'-methoxyphenyl)-6-triazine, 2,4-trichloromethyl-(4'-methoxystyryl)-6-triazine, 2,4-trichloromethyl-(pyflonyl)-6-triazine, 2,4-trichloromethyl-(3',4'-dimethoxyphenyl)-6-triazine, and 3-{4-[2,4-bis (tichloromethyl)-s-triazine-6-yl]phenylthio}propanoic acid; biimidazole-based compounds, such as 2,2'-bis(2-chlorophenyl)-4,4',5,5'-tetraphenyl biimidazole, and 2,2'-bis(2,3-dichlorophenyl)-4,4',5,5'-tetraphenylbiimidazole; acetophenone-based compounds, such as 2-hydroxy-2-methyl-1-phenylpropane-1-on, 1-(4-isopropylphenyl)-2-hydroxy-2-methylpropane-1-on, 4-(2-hydroxyethoxy)-phenyl (2-hydroxy)propyl ketone, 1-hydroxycyclohexyl phenyl ketone, benzoyl methyl ether, benzoyl ethyl ether, benzoyl isobutyl ether, benzoyl butyl ether, 2,2-dimethoxy-2-phenyl acetophenone, 2-methyl-(4-methylthiophenyl)-2-morpholino-1-propane-1-on, and 2-benzyl-2-dimethylamino-1-(4-morpholinophenyl)-butane-1-on; benzophenone-based compounds, such as benzophenone, 4,4'-bis(dimethylamino) benzophenone, 4,4'-bis(diethylamino)benzophenone, 2,4,6-trimethylaminobenzophenone, methyl-o-benzoylbenzoate, 3,3-dimethyl-4-methoxybenzophenone, and 3,3',4,4'-tetra(t-butylperoxycarbonyl)benzophenone; fluorenone-based compounds, such as 9-fluorenone, 2-chloro-9-fluorenone, and 2-methyl-9-fluorenone; thioxanthone-based compounds, such as thioxanthone, 2,4-diethyl thioxanthone, 2-chloro thioxanthone, 1-chloro-4-propyloxy thioxanthone, isopropyl thioxanthone, and diisopropyl thioxanthone; xanthone-based compounds, such as xanthone and 2-methylxanthone; anthraquinone-based compounds, such as anthraquinone, 2-methyl anthraquinone, 2-ethyl anthraquinone, t-butyl anthraquinone, and 2,6-dichloro-9,10-anthraquinone; acridine-based compounds, such as 9-phenylacridine, 1,7-bis(9-acridinyl)heptane, 1,5-bis(9-acridinyl)pentane, and 1,3-bis (9-acridinyl)propane; dicarbonyl-based compounds, such as benzyl, 1,7,7-trimethyl-bischloro[2,2,1]heptane-2,3-dione, and 9,10-phenanthrene quinone; phosphine oxide-based compounds, such as 2,4,6-trimethylbenzoyl diphenylphosphine oxide, bis(2,6-dimethoxybenzoyl)-2,4,4-trimethylpentyl phosphine oxide, and bis(2,6-dichlorobenzoyl) propyl phosphine oxide; amine-based compounds, such as methyl 4-(dimethylamino)benzoate, ethyl-4-(dimethylamino)benzoate, 2-n-butoxyethyl 4-(dimethylamino)benzoate, 2,5-bis (4-diethylaminobenzal)cyclopentanone, 2,6-bis(4-diethylaminobenzal)cyclohexanone, and 2,6-bis(4-diethylaminobenzal)-4-methyl-cyclohexanone; coumarin-based compounds, such as 3,3'-carbonylvinyl-7-(diethylamino)coumarin, 3-(2-benzothiazolyl)-7-(diethylamino)coumarin, 3-benzoyl-7-(diethylamino) coumarin, 3-benzoyl-7-methoxy-coumarin, and 10,10'-carbonylbis[1,1,7,7-tetramethyl-2,3,6,7-tetrahydro-1H,5H, 11H—Cl]-benzopyran o[6,7,8-ij]-quinolizin-11-one; chalcone-based compounds, such as 4-diethylaminochalcone and 4-azidebenzalacetophenone; 2-benzoylmethylene, and 3-methyl-naphthothiazoline. However, the photopolymerization initiator is not limited thereto, and materials that are known in the art may be used as the photopolymerization initiator.

Preferable examples of the D) solvent include one or more compounds selected from the group consisting of acetone, methyl ethyl ketone, methyl isobutyl ketone, methyl cellosolve, ethyl cellosolve, tetrahydrofuran, 1,4-dioxane, ethylene glycol dimethyl ether, ethylene glycol diethyl ether, propylene glycol dimethyl ether, propylene glycol diethyl ether, diethylene glycol dimethyl ether, diethylene glycol diethyl ether, diethylene glycol methyl ethyl ether, chloroform, methylene chloride, 1,2-dichloroethane, 1,1,1-trichloroethane, 1,1,2-trichloroethane, 1,1,2-trichloroethene, hexane, heptane, octane, cyclohexane, benzene, toluene, xylene, methanol, ethanol, isopropanol, propanol, butanol, t-butanol, 2-ethoxy propanol, 2-methoxypropanol, 3-methoxybutanol, cyclohexanone, cyclopentanone, propylene glycol methyl ether acetate, propylene glycol ethyl ether acetate, 3-methoxybutyl acetate, ethyl 3-ethoxypropionate, ethyl cellosolve acetate, methyl cellosolve acetate, butyl acetate, and dipropylene glycol monomethyl ether. However, the solvent is not limited thereto, and materials that are known in the art may be used as the solvent.

The photosensitive composition according to the present invention may further include one or more additives that are selected from the group consisting of a photo-sensitizer, a coloring agent, a curing accelerator, a thermal polymerization inhibitor, a plasticizer, an adhesion accelerator, a filler, and a surfactant if necessary.

The photosensitive composition according to the present invention may further include a photo-sensitizer in addition to the above-mentioned photopolymerization initiator, and substances that are exemplified as the above-mentioned photopolymerization initiator may be used as the photo-sensitizer.

One or more pigments, dyes, or mixtures thereof may be used as the coloring agent. Specific examples of the black pigment that can be used include carbon blacks, black leads, metal oxides and the like. Examples of the carbon blacks include SEAST 5HIISAF-HS, SEAST KH, SEAST 3HHAF-HS, SEAST NH, SEAST 3M, SEAST 300HAF-LS, SEAST 116HMMAF-HS, SEAST 116MAF, SEAST FMFEF-HS, SEAST SOFEF, SEAST VGPF, SEAST SVHSRF-HS, and SEAST SSRF (Tokai Carbon Co., Ltd.); DIAGRAM BLACK II, DIAGRAM BLACK N339, DIAGRAM BLACK SH, DIAGRAM BLACK H, DIAGRAM LH, DIAGRAM HA, DIAGRAM SF, DIAGRAM N550M, DIAGRAM M, DIAGRAM E, DIAGRAM G, DIAGRAM R, DIAGRAM N760M, DIAGRAM LR, #2700, #2630, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B, and OIL31B (Mitsubishi Chemical Co. Ltd.); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX- 35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa Ltd.); and RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-46J, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, and RAVEN-1170 (Colombia Carbon Co., Ltd.).

In addition, examples of the coloring agent for providing the color include CARMINE 6B (CI. 12490), PHTHALOCYANINE GREEN (CI. 74260), PHTHALOCYANINE BLUE (CI. 74160), PERYLENE BLACK (BASF K0084. K0086), CYANINE BLACK, LIONOL YELLOW (CI. 21090), LIONOL YELLOW GRO (CI. 21090), BENZIDINE YELLOW 4T-564D, VICTORIA PURE BLUE (CI. 42595), CI. PIGMENT RED 3, 23, 97, 108, 122, 139, 140, 141, 142, 143, 144, 149, 166, 168, 175, 177, 180, 185, 189, 190, 192, 202, 214, 215, 220, 221, 224, 230, 235, 242, 254, 255, 260, 262, 264, and 272; CI. PIGMENT GREEN 7 and 36; CI. PIGMENT blue 15:1, 15:3, 15:4, 15:6, 16, 22, 28, 36, 60, and 64; CI. PIGMENT yellow 13, 14, 35, 53, 83, 93, 95, 110, 120, 138, 139, 150, 151, 154, 175, 180, 181, 185, 194, and 213; and CI. PIGMENT VIOLET 15, 19, 23, 29, 32, and 37. Additionally, a white pigment, a fluorescent pigment and the like may be used as the coloring agent.

Examples of the above curing accelerator may include one or more compounds selected from the group consisting of 2-mercaptobenzoimidazole, 2-mercaptobenzothiazole, 2-mercaptobenzoxazole, 2,5-dimercapto-1,3,4-thiadiazole, 2-mercapto-4,6-dimethylaminopyridine, pentaerythritol tetrakis(3-mercaptopropionate), pentaerythritol tris(3-mercaptopropionate), pentaerythritol tetrakis(2-mercaptoacetate), pentaerythritol tris(2-mercaptoacetate), trimethylolpropane tris(2-mercaptoacetate), trimethylolpropane tris(3-mercaptopropionate), trimethylolethane tris(2-mercaptoacetate), and trimethyllolethane tris(3-mercaptopropionate). However, the curing accelerator is not limited thereto, and materials that are known in the art may be used as the curing accelerator.

Examples of the above thermal polymerization inhibitor may include one or more compounds selected from the group consisting of p-anisole, hydroquinone, pyrocatechol, t-butyl-catechol, N-nitrosophenylhydroxyamine ammonium salt, N-nitrosophenylhydroxyamine aluminum salt, and phenothiazine. However, the thermal polymerization inhibitor is not limited thereto, and materials that are known in the art may be used as the thermal polymerization inhibitor.

All of the compounds that may be included in the photoresist composition in the related art may be also used as the plasticizer, the adhesion promoter, the filler, and the surfactant.

The photoresist composition according to the present invention is used for a roll coater, a curtain coater, a spin coater, a slot die coater, various printing, and deposition, and may be applied on supports, such as a metal substrate, a paper substrate, a glass substrate, and a plastic substrate. Further, after being applied on a support such as a film, the photoresist composition may be transferred onto another other support. Alternatively, after being applied on a first support, the photoresist composition may be transferred onto the other supports. The method of applying the photoresist composition is not particularly limited.

For example, a mercury vapor arc, a carbon arc, a Xe arc, or the like, which emits light having a wavelength of 250 to 450 nm, may be used as a light source for curing the photoresist composition according to the present invention.

In addition, the present invention provides a color filter, an overcoat, and a column spacer that are manufactured by using the above photoresist composition.

MODE FOR THE INVENTION

Hereinafter, the present invention will be described in detail in light of Examples and Experimental Examples. The present invention may, however, be embodied in many different forms and should not be construed as being limited to the Examples and Experimental Examples set forth herein. Rather, these Examples and Experimental Examples are provided such that this disclosure will be thorough and complete and will fully convey the concept of the present invention to those skilled in the art.

SYNTHETIC EXAMPLE 1

Preparation of the Alkali-developable Resin (1) Synthesis of the Polymer Including the Unit that is Represented by Formula 1 and the Unit that is Represented by Formula 2

140 g of benzyl methacrylate, 100 g of ethyl α-hydroxymethyl acrylate, 3 g of the 3-mercaptopropionic acid that was the chain transfer agent, and 700 g of propylene glycol monomethylether acetate (PGMEA) that was the solvent were mixed with each other in a nitrogen atmosphere for 30 min by using the mechanical stirrer. The temperature of the reactor was increased to 70° C. under the nitrogen atmosphere. In the case of when the temperature of the mixture approached 70° C., 60 g of AIBN that was the thermal polymerization initiator was put into the mixture and then stirred for 8 hours. While the polymerization was performed, the precipitates of the polymer were not formed, and the yield of the polymerization was 97% or more, which meant that the yield was high.

(2) Introduction of the Unit that is Represented by Formula 3

The temperature of the reactor in which the polymer that included the unit that is represented by Formula 1 and the unit that is represented by Formula 2 of (1) was polymerized was increased to 80° C., 2 g of tetrabutyl ammonium bromide and 0.25 g of MEHQ that was the thermal polymerization inhibitor were added, and the agitation was performed for 30 min. Next, 160 g of trimellitic anhydride was put thereinto, the temperature of the reactor was increased to 100° C., and the agitation was performed for 20 hours.

(3) Introduction of the Unit that is Represented by Formula 4 and the Unit that is Represented by Formula 5

115 g of glycidyl methacrylate was put into the solution that contained the polymer including the unit that is represented by Formula 1, the unit that is represented by Formula 2, and the unit that is represented by Formula 3 of (2), and additional stirring was performed at 115° C. it 12 hours to finish the synthesis of the desired resin. The NMR graph of the desired resin is shown in FIG. 1 (Mw=18,000 and AV (Acid Value)=55).

SYNTHETIC EXAMPLE 2

Preparation of the Alkali-developable Resin (1) Synthesis of the Polymer Including the Unit that is Represented by Formula 1 and the Unit that is Represented by Formula 2

120 g of benzyl methacrylate, 130 g of ethyl α-hydroxymethyl acrylate, 3 g of the 3-mercaptopropionic acid that was the chain transfer agent, and 700 g of propylene glycol monomethylether acetate (PGMEA) that was the solvent were mixed with each other in a nitrogen atmosphere for 30 min by using the mechanical stirrer. The temperature of the reactor was increased to 70° C. under the nitrogen atmosphere. In the case of when the temperature of the mixture approached 70° C., 60 g of AIBN that was the thermal polymerization initiator was put into the mixture and then stirred for 8 hours. While the polymerization was performed, the precipitates of the polymer were not formed, and the yield of the polymerization was 97% or more, which meant that the yield was high.

(2) Introduction of the Unit that is Represented by Formula 3

The temperature of the reactor in which the polymer that included the unit that is represented by Formula 1 and the unit that is represented by Formula 2 of (1) was polymerized was increased to 80° C., 2 g of tetrabutyl ammonium bromide and 0.25 g of MEHQ that was the thermal polymerization inhibitor were added, and the agitation was performed for 30 min. Next, 190 g of trimellitic anhydride was put thereinto, the temperature of the reactor was increased to 100° C., and the agitation was performed for 20 hours.

(3) Introduction of the Unit that is Represented by Formula 4 and the Unit that is Represented by Formula 5

Figure 2:
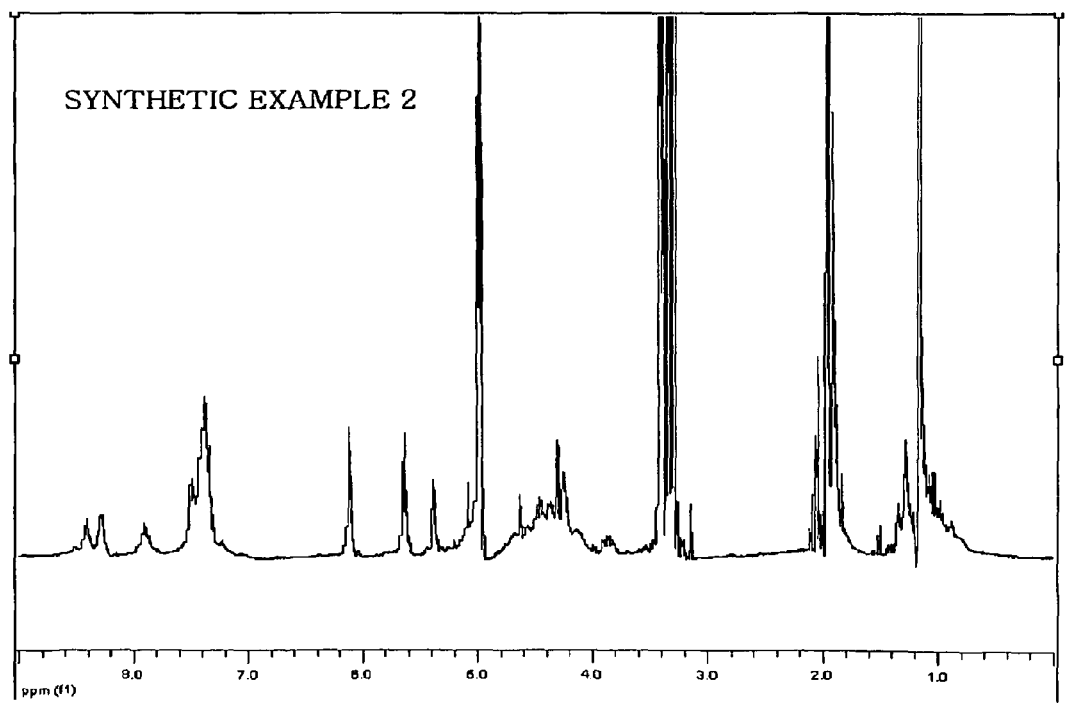
FIG. 2 is an NMR graph of an alkali-developable resin that is produced in Synthetic Example 2 of the present invention.

60 g of glycidyl methacrylate was put into the solution that contained the polymer including the unit that is represented by Formula 1, the unit that is represented by Formula 2, and the unit that is represented by Formula 3 of (2), and additional stirring was performed at 115° C. for 12 hours to finish the synthesis of the desired resin. The NMR graph of the desired resin is shown in FIG. 2 (Mw=17,000 and AV=95).

COMPARATIVE SYNTHETIC EXAMPLE 1

43.2 g of benzyl methacrylate, 168 g of the methacrylic acid, 0.5 g of the 3-mercaptopropionic acid that was the chain transfer agent, and 280 g of ethyl 3-ethoxy propionate that was the solvent were mixed with each other under the nitrogen atmosphere for 30 min by using the mechanical stirrer. The temperature of the reactor was increased to 60° C. under the nitrogen atmosphere. In the case of when the temperature of the mixture approached (0° C., 2.6 g of AIBN that was the thermal polymerization initiator was put into the mixture and then stirred far 12 hours (Mw=18,000 and AV=90).

COMPARATIVE SYNTHETIC EXAMPLE 2

(1) Linear Binder Polymerization 45.8 g of benzyl methacrylate, 22.5 g of the methacrylic acid, 0.5 g of the 3-mercaptopropionic acid that was the chain transfer agent, and 300 g of ethyl 3-ethoxy propionate that was the solvent were mixed with each other in a nitrogen atmosphere for 30 min by using the mechanical stirrer. The temperature of the reactor was increased to (0° C. under the nitrogen atmosphere. In the case of when the temperature of the mixture approached 60° C., 2.6 g of AIBN that was the thermal polymerization initiator was put into the mixture and then stirred for 12 hours. While the polymerization was performed, the precipitates of the polymer were not formed, and the yield of the polymerization was 98% or more, which meant that the yield was high.

(2) Introduction of the Photo-Reactive Group

The temperature of the reactor in which the linear binder was polymerized was increased to 90° C., and 0.2 g of triphenyl phosphine was added to the reactor. 0.07 g of MEHQ that was the thermal polymerization inhibitor were added, and the agitation was performed for 30 min. Next, 20 g of glycidyl methacrylate was put into the reactor, the temperature of the reactor was increased to 110° C. while the air atmosphere was maintained, and the agitation was performed for 12 hours.

(3) Introduction of the Acidic Group 20.4 g of trimellitic anhydride was put into the polymer solution, and additional agitation was performed at 110° C. for 6 hours to finish the synthesis of the desired resin (Mw=20,000 and AV=90).

EXAMPLE 1

50 g of the C.I. Pigment Red 254 dispersion solution that was used as the pigment, 5 g of the alkali-developable resin that was synthesized in the above Synthetic Example 1, 3 g of dipenthaerithritol hexaacrylate that was the polymerizable compound, 2 g of the photopolymerization initiator I-369, and 40 g of PGMEA (propyleneglycol methyl ether acetate) that was the organic solvent were mixed with each other for 3 hours to prepare the photosensitive composition.

The photosensitive composition solution was applied on glass by using a spin coating process, and then subjected to a prebaking treatment process at about 100° C. for 2 min to form the film.

The film was exposed at various types of energy levels (100, 150, 200, 250, and 300 mJ/cm$^2$) by using the photomask under the high-pressure mercury lamp, and the patterns were developed by using the KOH alkali aqueous solution having the pH in the range of 11.3 to 11.7 every hour and washed by using deionized water. After the resulting film was subjected to the postbaking treatment process at 220° C. for about 30 min, the surface and the patterns of glass were observed by using an optical microscope and an electron microscope.

EXAMPLE 2

The procedure of the above Example 1 was repeated, except that among the components of the photosensitive composition, 5 g of the alkali-developable resin that was synthesized in the above Synthetic Example 2 was used as the alkali-developable resin. Next, the surface and the patterns of glass were observed.

COMPARATIVE EXAMPLE 1

The procedure of the above Example 1 was repeated, except that among the components of the photosensitive composition, 5 g of the BzMA/MAA copolymer (weight ratio=86/14, Mw=18,000, and AV=90) of the above Comparative Synthetic Example 1 was used as the alkali-developable resin. Next, the surface and the patterns of glass were observed.

COMPARATIVE EXAMPLE 2

The procedure of the above Example 1 was repeated, except that among the components of the photosensitive composition, 5 g of the alkali-developable resin of the above Comparative Synthetic Example 2 was used as the alkali-developable resin. Next, the surface and the patterns of glass were observed.

EXPERIMENTAL EXAMPLE 1

Results of Developability Evaluation

The results of the above Examples 1 to 2 and Comparative Examples 1 to 2 are described in the following Tables 1 to 3. With respect to the evaluation of the developability of the present experiment, the measurement was performed based on the standard exposure dose of 150 mJ/cm$^2$.

TABLE 1

| Development time | 20 sec | 30 sec | 50 sec |
|---|---|---|---|
| Example 1 | under-develop | Good | Good |
| Example 2 | Good | Good | Good |
| Comparative Example 1 | under-develop | under-develop | Good |
| Comparative Example 2 | under-develop | Good | Good | under-develop: under-develop means a state in which the development time is additionally required.

As described in the above Table 1, the developability of each of the photosensitive compositions of Examples 1 to 2, which included the alkali-developable resin according to the present invention, was better than the developability of each of the photosensitive compositions of Comparative Examples 1 to 2, which included a typical alkali-developable resin.

EXPERIMENTAL EXAMPLE 2

Results of the Photosensitivity Evaluation

With respect to the evaluation of the sensitivity according to the present experiment, the measurement was performed based on the standard development time of 50 sec. The measured values of the following Table 2 were minimum sizes of the pixel that remained after the development when the exposure was performed by using the line & space mask.

TABLE 2

| Exposure dose | 100 mJ/cm$^3$ | 150 mJ/cm$^3$ | 250 mJ/cm$^3$ |
|---|---|---|---|
| Example 1 | <10 μm | <10 μm | <10 μm |
| Example 2 | <10 μm | <10 μm | <10 μm |
| Comparative Example 1 | 28 μm | 25 μm | 14 μm |
| Comparative Example 2 | 14 μm | <10 μm | <10 μm |

As described in the above Table 2, the photosensitivity of each of the photosensitive compositions of Examples 1 to 2, which included the alkali-developable resin according to the present invention, was better than the photosensitivity of each of the photosensitive compositions of Comparative Examples 1 to 2, which included a typical alkali-developable resin.

EXPERIMENTAL EXAMPLE 3

Results of the Film Remaining Rate Evaluation

With respect to the evaluation of the film remaining rate according to the present experiment, the measurement was performed based on the standard development time of 50 sec and the exposure dose of 100 mJ/cm$^2$.

TABLE 3

|  | Example 1 | Example 2 | Comparative Example 1 | Comparative Example 2 |
|---|---|---|---|---|
| Film remaining rate | 91% | 90% | 88% | 85% | film remaining rate (%) = (film thickness after the postbaking treatment)/(film thickness before the postbaking treatment) × 100

As described in the above Table 3, the film remaining rate of each of the photosensitive compositions of Examples 1 to 2, which included the alkali-developable resin according to the present invention, was higher than the film remaining rate of each of the photosensitive compositions of Comparative Examples 1 to 2, which included a typical alkali-developable resin.

The invention claimed is:
1. An alkali-developable resin comprising:
a unit that is represented by the following Formula 1;
a unit that is represented by the following Formula 2;
a unit that is represented by the following Formula 3;
a unit that is represented by the following Formula 4; and
a unit that is represented by the following Formula 5:

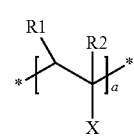

[Formula 1]

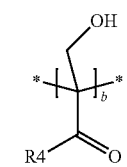

[Formula 2]

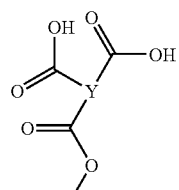

[Formula 3]

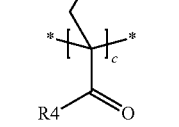

[Formula 4]

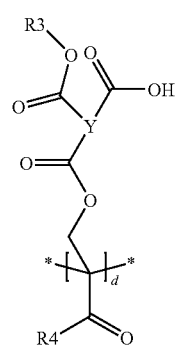

[Formula 5]

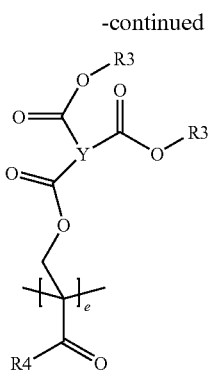

wherein R1 is hydrogen or a group that forms a 5-membered cyclic carboxylic anhydride or imide structure in conjunction with X, R2s are each independently hydrogen or methyl, R3 is a group that is derived from a compound selected from the group consisting of glycidyl(meth)acrylate, allyl glycidyl ether, 3,4-epoxycyclohexylmethyl(meth)acrylate, glycidyl 5-norbornene-2-methyl-2-carboxylate (endo and exo mixtures), 1,2-epoxy-5-hexene, and 1,2-epoxy-9-decene, R4s are each independently a $C_1$ to $C_4$ alkoxy group, X is any one selected from the group consisting of $C_1$ to $C_{12}$ alkyl ester, $C_2$ to $C_6$ alkyl ester that is substituted with 1 to 2 hydroxyl groups, $C_2$ to $C_6$ alkyl ester that is substituted with a $C_1$ to $C_3$ alkoxy group, $C_1$ to $C_6$ alkyl ester that is substituted with a halogen group, $C_1$ to $C_3$ alkoxy poly(n=2 to 30) alkylene ($C_2$ to $C_3$) glycol ester, $C_1$ to $C_6$ alkyl ester that is substituted with a phenyl group, phenyl that is substituted with a $C_1$ to $C_6$ alkyl group, phenyl that is substituted with $C_1$ to $C_6$ alkoxy, phenyl that is substituted with a halogen group, $C_1$ to $C_6$ alkoxy methyl, glycidoxy methyl, and a group that forms a 5-membered cyclic carboxylic anhydride or imide structure in conjunction with R1, a, b, c, d, and e are each a molar ratio, a is in the range of 10 to 90, b is in the range of 5 to 30, c is in the range of 1 to 40, and d and e are each independently in the range of 1 to 40, Y is a group that is generated by using a ring opening polymerization reaction of a compound that is represented by the following Formula 7 and an alcohol group of the unit that is represented by the above Formula 2,

[Formula 7]

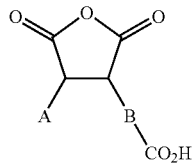

wherein A is any one selected from the group consisting of hydrogen, $C_1$ to $C_6$ alkoxy, phenoxy, $C_1$ to $C_{10}$ alkyl that is unsubstituted or substituted with halogen, $C_2$ to $C_{10}$ alkenyl that includes 1 to 3 unsaturated groups, and phenyl, and B is any one selected from the group consisting of $C_1$ to $C_6$ alkoxy, phenoxy, $C_1$ to $C_{10}$ alkylene that is unsubstituted or substituted with halogen, $C_2$ to $C_{10}$ alkenylene that includes 1 to 3 unsaturated groups, and phenylene, and A and B may be connected to each other to form a pentagonal or hexagonal cycle.

2. The alkali-developable resin according to claim 1, wherein an acid value of the alkali-developable resin is in the range of 30 to 300 KOH mg/g.

3. The alkali-developable resin according to claim 1, wherein a weight average molecular weight of the alkali-developable resin is in the range of 1,000 to 200,000.

4. The alkali-developable resin according to claim 1, wherein a monomer used to form the unit that is represented by Formula 1 includes one or more compounds that are selected from the group consisting of unsaturated carboxylic acid esters, aromatic vinyls, unsaturated ethers, N-vinyl tertiary amines, unsaturated imides, and maleic anhydrides.

5. The alkali-developable resin according to claim 1, wherein a monomer used to form the unit that is represented by Formula 2 includes one or more compounds selected from the group consisting of methyl α-hydroxymethyl acrylate, ethyl α-hydroxymethyl acrylate, propyl α-hydroxymethyl acrylate, and butyl α-hydroxymethyl acrylate.

6. The alkali-developable resin according to claim 1, wherein the compound that is represented by the above Formula 7 includes a compound that is represented by any one of the following Formulae 8 to 15:

[Formula 8]

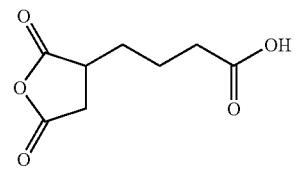

[Formula 9]

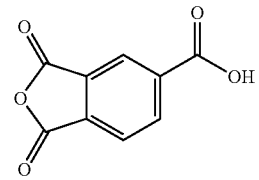

[Formula 10]

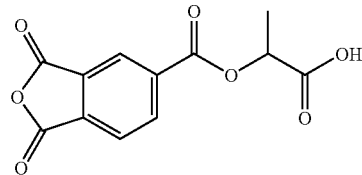

[Formula 11]

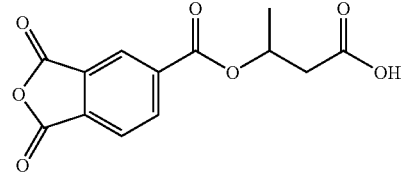

[Formula 12]

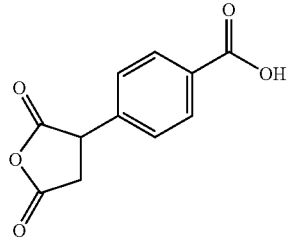

-continued

[Formula 13]

[Formula 14]

[Formula 15]

7. A method of producing an alkali-developable resin, the method comprising the steps of:
   a) polymerizing a monomer used to form a unit that is represented by the following Formula 1 and a monomer used to form a unit that is represented by the following Formula 2 to prepare a polymer;
   b) adding a compound that is represented by the following Formula 7 to the polymer of the above step a) and performing polymerization to prepare a polymer; and
   c) adding a compound containing an epoxy group to the polymer of the above step b) to perform polymerization:

[Formula 1]

[Formula 2]

wherein R1 is hydrogen or a group that forms a 5-membered cyclic carboxylic anhydride or imide structure in conjunction with X,
R2 is hydrogen or methyl,
R4 is a $C_1$ to $C_4$ alkoxy group,
X is any one selected from the group consisting of $C_1$ to $C_{12}$ alkyl ester, $C_2$ to $C_6$ alkyl ester that is substituted with 1 to 2 hydroxyl groups, $C_2$ to $C_6$ alkyl ester that is substituted with a $C_1$ to $C_3$ alkoxy group, $C_1$ to $C_6$ alkyl ester that is substituted with a halogen group, $C_1$ to $C_3$ alkoxy poly(n=2 to 30) alkylene ($C_2$ to $C_3$) glycol ester, $C_1$ to $C_6$ alkyl ester that is substituted with a phenyl group, phenyl that is substituted with a $C_1$ to $C_6$ alkyl group, phenyl that is substituted with $C_1$ to $C_6$ alkoxy, phenyl that is substituted with a halogen group, $C_1$ to $C_6$ alkoxy methyl, glycidoxy methyl, and a group that forms a 5-membered cyclic carboxylic anhydride or imide structure in conjunction with R1, a and b are each a molar ratio, a is in the range of 10 to 90, and b is in the range of 5 to 30,

[Formula 7]

wherein A is any one selected from the group consisting of hydrogen, $C_1$ to $C_6$ alkoxy, phenoxy, $C_1$ to $C_{10}$ alkyl that is unsubstituted or substituted with halogen, $C_2$ to $C_{10}$ alkenyl that includes 1 to 3 unsaturated groups, and phenyl, and B is any one selected from the group consisting of $C_1$ to $C_6$ alkoxy, phenoxy, $C_1$ to $C_{10}$ alkylene that is unsubstituted or substituted with halogen, $C_2$ to $C_{10}$ alkenylene that includes 1 to 3 unsaturated groups, and phenylene, and A and B may be connected to each other to form a pentagonal or hexagonal cycle.

8. The method of producing an alkali-developable resin according to claim 7, wherein a monomer used to form the unit that is represented by Formula 1 in the above step a) includes one or more compounds that are selected from the group consisting of unsaturated carboxylic acid esters, aromatic vinyls, unsaturated ethers, N-vinyl tertiary amines, unsaturated imides, and maleic anhydrides.

9. The method of producing an alkali-developable resin according to claim 7, wherein a monomer used to form the unit that is represented by Formula 2 in the above step a) includes one or more compounds selected from the group consisting of methyl α-hydroxymethyl acrylate, ethyl α-hydroxymethyl acrylate, propyl α-hydroxymethyl acrylate, and butyl α-hydroxymethyl acrylate.

10. The method of producing an alkali-developable resin according to claim 7, wherein the step a) further comprises adding a radical polymerization initiator or a chain transfer agent.

11. The method of producing an alkali-developable resin according to claim 7, wherein the compound that is represented by Formula 7 in the above step b) includes a compound that is represented by any one of the following Formulae 8 to 15:

[Formula 8]

23

-continued

[Formula 9]

[Formula 10]

[Formula 11]

[Formula 12]

[Formula 13]

[Formula 14]

[Formula 15]

12. The method of producing an alkali-developable resin according to claim 7, wherein the step b) is performed at a temperature in the range of 90 to 120° C.

13. The method of producing an alkali-developable resin according to claim 7, wherein the compound containing the

24 epoxy group in the above step c) is selected from the group consisting of glycidyl(meth)acrylate, allyl glycidyl ether, glycidyl(meth)acrylate, 3,4-epoxycyclohexylmethyl(meth) acrylate, glycidyl 5-norbornene-2-methyl-2-carboxylate (endo and exo mixtures), 1,2-epoxy-5-hexene, and 1,2-epoxy-9-decene.

14. The method of producing an alkali-developable resin according to claim 7, wherein the step c) further comprises adding a thermal polymerization inhibitor.

15. The method of producing an alkali-developable resin according to claim 7, wherein the step c) is performed at a temperature in the range of 100 to 150° C.

16. A photosensitive composition comprising:

A) an alkali-developable resin including a unit that is represented by Formula 1, a unit that is represented by Formula 2, a unit that is represented by Formula 3, a unit that is represented by Formula 4, and a unit that is represented by Formula 5;

B) a polymerizable compound having an ethylenically unsaturated bond;

C) a photopolymerization initiator; and

D) a solvent:

[Formula 1]

[Formula 2]

[Formula 3]

[Formula 4]

[Formula 5]

(structural formula showing R3, Y, R4 substituents with ester/acrylate groups)

wherein R1 is hydrogen or a group that forms a 5-membered cyclic carboxylic anhydride or imide structure in conjunction with X, R2s are each independently hydrogen or methyl, R3 is a group that is derived from a compound selected from the group consisting of glycidyl(meth)acrylate, allyl glycidyl ether, 3,4-epoxycyclohexylmethyl(meth)acrylate, glycidyl 5-norbornene-2-methyl-2-carboxylate (endo and exo mixtures), 1,2-epoxy-5-hexene, and 1,2-epoxy-9-decene, R4s are each independently a $C_1$ to $C_4$ alkoxy group, X is any one selected from the group consisting of $C_1$ to $C_{12}$ alkyl ester, $C_2$ to $C_6$ alkyl ester that is substituted with 1 to 2 hydroxyl groups, $C_2$ to $C_6$ alkyl ester that is substituted with a $C_1$ to $C_3$ alkoxy group, $C_1$ to $C_6$ alkyl ester that is substituted with a halogen group, $C_1$ to $C_3$ alkoxy poly(n=2 to 30) alkylene ($C_2$ to $C_3$) glycol ester, $C_1$ to $C_6$ alkyl ester that is substituted with a phenyl group, phenyl that is substituted with a $C_1$ to $C_6$ alkyl group, phenyl that is substituted with $C_1$ to $C_6$ alkoxy, phenyl that is substituted with a halogen group, $C_1$ to $C_6$ alkoxy methyl, glycidoxy methyl, and a group that forms a 5-membered cyclic carboxylic anhydride or imide structure in conjunction with R1, a, b, c, d, and e are each a molar ratio, a is in the range of 10 to 90, b is in the range of 5 to 30, c is in the range of 1 to 40, and d and e are each independently in the range of 1 to 40, Y is a group that is generated by using a ring opening polymerization reaction of a compound that is represented by the following Formula 7 and an alcohol group of the unit that is represented by the above Formula 2,

[Formula 7]

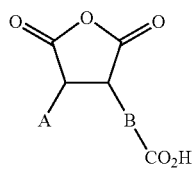

wherein A is any one selected from the group consisting of hydrogen, $C_1$ to $C_6$ alkoxy, phenoxy, $C_1$ to $C_{10}$ alkyl that is unsubstituted or substituted with halogen, $C_2$ to $C_{10}$ alkenyl that includes 1 to 3 unsaturated groups, and phenyl, and B is any one selected from the group consisting of $C_1$ to $C_6$ alkoxy, phenoxy, $C_1$ to $C_{10}$ alkylene that is unsubstituted or substituted with halogen, $C_2$ to $C_{10}$ alkenylene that includes 1 to 3 unsaturated groups, and phenylene, and A and B may be connected to each other to form a pentagonal or hexagonal cycle.

17. The photosensitive composition according to claim 16, wherein the photosensitive composition comprises A) 1 to 30 parts by weight of the alkali-developable resin, B) 0.5 to 20 parts by weight of the polymerizable compound having the ethylenically unsaturated bond, C) 0.1 to 15 parts by weight of the photopolymerization initiator, and D) 35 to 95 parts by weight of the solvent based on 100 parts by weight of the photosensitive composition.

18. The photosensitive composition according to claim 16, wherein the B) polymerizable compound having the ethylenically unsaturated bond includes one or more compounds selected from the group consisting of compounds obtained by esterifying polyhydric alcohols with α,β-unsaturated carboxylic acids; compounds obtained by adding a (meth)acrylic acid to a compound containing glycidyl group; ester compounds obtained from a compound having a hydroxyl group or an ethylenically unsaturated bond and a polyhydriccarboxylic acid, and adducts a compound having a hydroxyl group or an ethylenically unsaturated bond with polyisocyanate; and (meth)acrylic acid alkyl esters.

19. The photosensitive composition according to claim 16, wherein the photosensitive composition further comprises one or more additives selected from the group consisting of a photo-sensitizer, a coloring agent, a curing accelerator, a thermal polymerization inhibitor, a plasticizer, an adhesion accelerator, a filler, and a surfactant.

20. The photosensitive composition according to claim 19, wherein the photosensitive composition comprises 0.5 to 20 parts by weight of the coloring agent and 0.01 to 20 parts by weight of one or more compounds selected from the group consisting of the photo-sensitizer, the curing accelerator, the thermal polymerization inhibitor, the plasticizer, the adhesion accelerator, the filler, and the surfactant based on 100 parts by weight of the photosensitive composition.

* * * * *